(12) United States Patent
Harris et al.

(10) Patent No.: US 8,678,237 B2
(45) Date of Patent: Mar. 25, 2014

(54) MICRO DOSING PANEL SYSTEM

(75) Inventors: Jaime L. Harris, Rosemount, MN (US);
Karl J. Fritze, Hastings, MN (US);
Christopher Molitor, Savage, MN (US); Zachary Cornett, Lakeville, MN (US)

(73) Assignee: Hydra-Flex, Inc., Burnsville, MN (US)

( * ) Notice: Subject to any disclaimer, the term of this patent is extended or adjusted under 35 U.S.C. 154(b) by 45 days.

(21) Appl. No.: 13/460,208

(22) Filed: Apr. 30, 2012

(65) Prior Publication Data
US 2012/0325853 A1 Dec. 27, 2012

Related U.S. Application Data

(60) Provisional application No. 61/480,897, filed on Apr. 29, 2011.

(51) Int. Cl.
*B67D 7/76* (2010.01)

(52) U.S. Cl.
USPC .......................................... 222/133; 137/898

(58) Field of Classification Search
USPC ............... 222/190, 132, 133, 145.5; 137/896, 137/898, 564.5; 134/57 R, 100.1; 169/15; 239/61
See application file for complete search history.

(56) References Cited

U.S. PATENT DOCUMENTS

| | | | | | |
|---|---|---|---|---|---|
| 3,658,590 | A | * | 4/1972 | Huebner et al. | 134/32 |
| 4,194,650 | A | * | 3/1980 | Nottke et al. | 222/57 |
| 4,246,969 | A | * | 1/1981 | McLoughlin et al. | 169/13 |
| 4,324,294 | A | * | 4/1982 | McLoughlin et al. | 169/13 |
| 4,469,137 | A | * | 9/1984 | Cleland | 137/893 |
| 5,016,665 | A | * | 5/1991 | Konieczynski | 137/1 |
| 5,113,945 | A | * | 5/1992 | Cable | 169/15 |
| 2006/0157131 | A1 | | 7/2006 | Harris et al. | |
| 2007/0018010 | A1 | * | 1/2007 | Mehus et al. | 239/6 |
| 2009/0090415 | A1 | | 4/2009 | Harris et al. | |
| 2011/0192433 | A1 | * | 8/2011 | Harris et al. | 134/57 R |
| 2012/0187145 | A1 | * | 7/2012 | Gould et al. | 222/1 |

* cited by examiner

*Primary Examiner* — Paul R Durand
*Assistant Examiner* — Charles P Cheyney
(74) *Attorney, Agent, or Firm* — Patterson Thuente Pedersen, P.A.

(57) ABSTRACT

Chemical dispensing systems and related methods for precision handling of fluids including water and bulk chemicals. Representative chemical dispensing system can include wall mounted dispensing panels or portable, frame mounted dispensing units. These chemical dispensing systems provide easy access to all required interfaces including water, chemical, air, electrical and solution. The wall mounted dispensing panel can include a molded routing panel having molded recesses for mounting and managing specific air, fluid and control modules. The portable, frame mounted dispensing unit can include an onboard pump assembly for pressurizing a motive fluid. The frame assembly can include one or more lifting handles and adjustable feet to allow for easy transportation and placement of the portable dispensing unit.

12 Claims, 10 Drawing Sheets

MICRO DOSING PANEL SYSTEM

RELATED APPLICATION

The present application claims the benefit of U.S. Provisional Application No. 61/480,897 filed Apr. 29, 2011, and entitled "MICRO DOSING PANEL SYSTEM", which is herein incorporated in its entirety by reference.

FIELD OF THE DISCLOSURE

The present disclosure relates to the field of chemical dilution and dispensing. In particular, a compact and clean delivery system that takes concentrated liquid chemicals and mixes them with a liquid carrier diluent such as water using a venturi eductor.

BACKGROUND OF THE DISCLOSURE

Chemical dilution and dispensing equipment is often utilized in the spraying of chemicals for cleaning, fertilizing, application of pesticides, rinsing, and chemical applications. It is well known that concentrated bulk chemicals cost less to store and transport than equivalent amounts of fully diluted chemicals. For this reason, venturi eductor systems are used widely in industry and residential applications to dilute the concentrated bulk chemical into its correct concentration for subsequent application. Venturi eductors perform this job very well and can be very accurate in their dilution ratios. However, the very small orifices in the venturi can become clogged and require periodic replacement. Many systems utilize pipe threads, hose barbs, or even push-to-connect fittings to make the liquid connections. It is often difficult to remove and replace these eductors and require trained personnel.

Chemical dilution and dispensing equipment is often installed haphazardly in random installations without specific consideration regarding best practices of protecting components and reducing run lengths for wiring and tubing runs. As a consequence, installations are often confusing due to wiring and tubing that seems to run everywhere as well as being inconvenient for troubleshooting and repairing/replacing components.

As such, it would be advantageous to have chemical dispensing systems that are designed for quick placement and connection in a desired dispensing location. Furthermore, it would be advantageous if these systems were designed with mechanisms to protect the various componentry and to simplify external input and output connections.

SUMMARY OF THE DISCLOSURE

The systems of the present invention offer many benefits to markets and segments that want precision handling of fluids including water and bulk chemicals A representative chemical dispensing system can comprise a wall mounted dispensing panel or skid mounted dispensing unit, wherein either version provides easy access to all required interfaces including water, chemical, air, electrical and solution. The wall mounted dispensing panel can include a molded routing panel having molded recesses for mounting and managing specific air, fluid and control modules. The molded routing panel can include upper and lower mounting flanges that allow for easy installation above one or more bulk chemical tanks. The various air, fluid and control modules are easily mounted and removed from the molded recesses for easy assembly, maintenance, repair and replacement. The molded routing panel can include molded recesses that allow for operators to install and remove the various fluid fittings and injectors. The injectors are plug-n play style with quick coupler connections that allow multiple options for injector sizes and colors and allows for individual injectors to be quickly replaced if chemicals change or if eduction properties need to change. The molded routing panel further allows for fluid connections to be managed at a bottom wall of the molded routing panel such that they align vertically with unit. The skid mounting dispensing unit can comprise a portable dispensing unit that utilizes a frame assembly with an onboard pump assembly for pressurizing a motive fluid. The frame assembly can include one or more lifting handles and adjustable feet to allow for easy transportation and placement of the portable dispensing unit.

In one aspect, the present invention comprises a chemical dispensing panel that is configured for placing and securing above a bulk chemical tank. The chemical dispensing panel can comprise a molded routing panel having molded recesses for mounting and managing specific air, fluid and control modules. The molded recesses provide for a clean installation and further serve to protect the air, fluid and control modules from damage. The chemical dispensing panel can be quickly attached to dispensing inputs including a motive fluid inlet line, a control signal input, one or more chemical eductor lines and a pneumatic supply line. In addition, dispensing outputs including one or more mixed fluid outlet lines and one or more foaming air outlet lines can be quickly and easily attached. The control module can utilize the control signal input to selectively open one or more solenoid valves on one or more chemical ejectors such that the bulk chemical can be educted into the motive fluid. The control module can further direct one or more pneumatic valves to open such that pressurized air is delivered to a mixing manifold so as to foam the bulk chemical in a mixed fluid out line at a point of use. The chemical dispensing assembly can be utilized in a variety of industries including, example, carwashes, food processing and preparation, wastewater treatment and industrial clean-in-place applications.

In another aspect, the present invention is directed to methods for dispensing chemicals. The method can include molding a routing panel including a plurality of mounting recesses. The method can further comprise attaching fluid injection modules, air modules and control modules to the various mounting recesses. The method can further comprise mounting the routing panel above a bulk chemical tank. The method can further comprise attaching various input lines to the routing panel including a pressurized motive fluid line, a control signal input, a plurality of chemical eductor lines and a pneumatic supply line. The method can further comprise attaching various output lines to the routing panel including a plurality of mixed fluid lines and a plurality of foaming air outlet lines. The method can further comprise receiving a control signal through the control signal input wherein the control module is selectively directed to open one or more solenoid valves such that the bulk chemical can be educted into the motive fluid through one or more injectors. The method can further comprise receiving the control signal such that the control module selectively opens one or more pneumatic valves for supply pressurized air to one or more foaming air outlet lines for foaming the bulk chemical within a mixing manifold at a point of use.

In yet another aspect, the present invention is directed to a portable dispensing unit that is configured for easy transportation. The portable dispensing unit can comprise a frame assembly having an onboard pump assembly for pressurizing a motive fluid. The frame assembly can include one or more lifting handles and adjustable feet to allow for easy transportation and placement of the portable dispensing unit. The frame assembly can further comprise a chemical injector and solenoid valve, wherein the chemical injector attaches to a chemical eductor line for educting a bulk chemical from a bulk chemical tank. The frame assembly further includes a pneumatic assembly including one or more pneumatic valves for supplying pressurized air to a foaming air outlet line. A control signal can energize the pump assembly and solenoid valve such that the bulk chemical is educted into a motive fluid to form a mixed fluid that is dispensed through a mixed fluid line. The mixed fluid line attaches to a mixing manifold wherein the foaming air outlet line can deliver pressurized air for foaming the bulk chemical at a point of use.

The above summary of the invention is not intended to describe each illustrated embodiment or every implementation of the present invention. The figures and the detailed description that follow more particularly exemplify these embodiments.

BRIEF DESCRIPTION OF THE FIGURES

The present invention is more completely understood in consideration of the following detailed description of various embodiments in connection with the accompanying drawings, in which.

Figure 1:
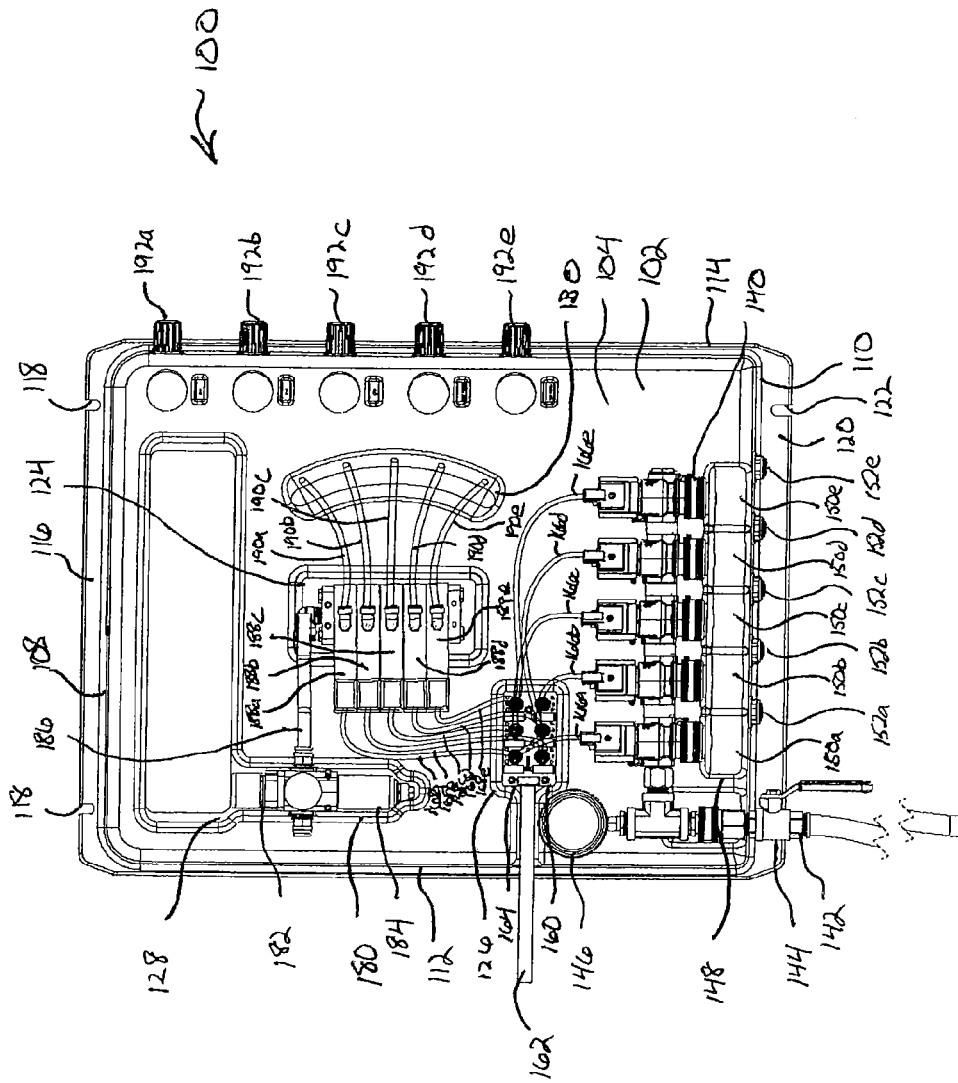
FIG. 1 is a front view of a chemical dispensing assembly according to an embodiment of the present invention.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention as defined by the appended claims.

DETAILED DESCRIPTION OF THE FIGURES

Figure 2:
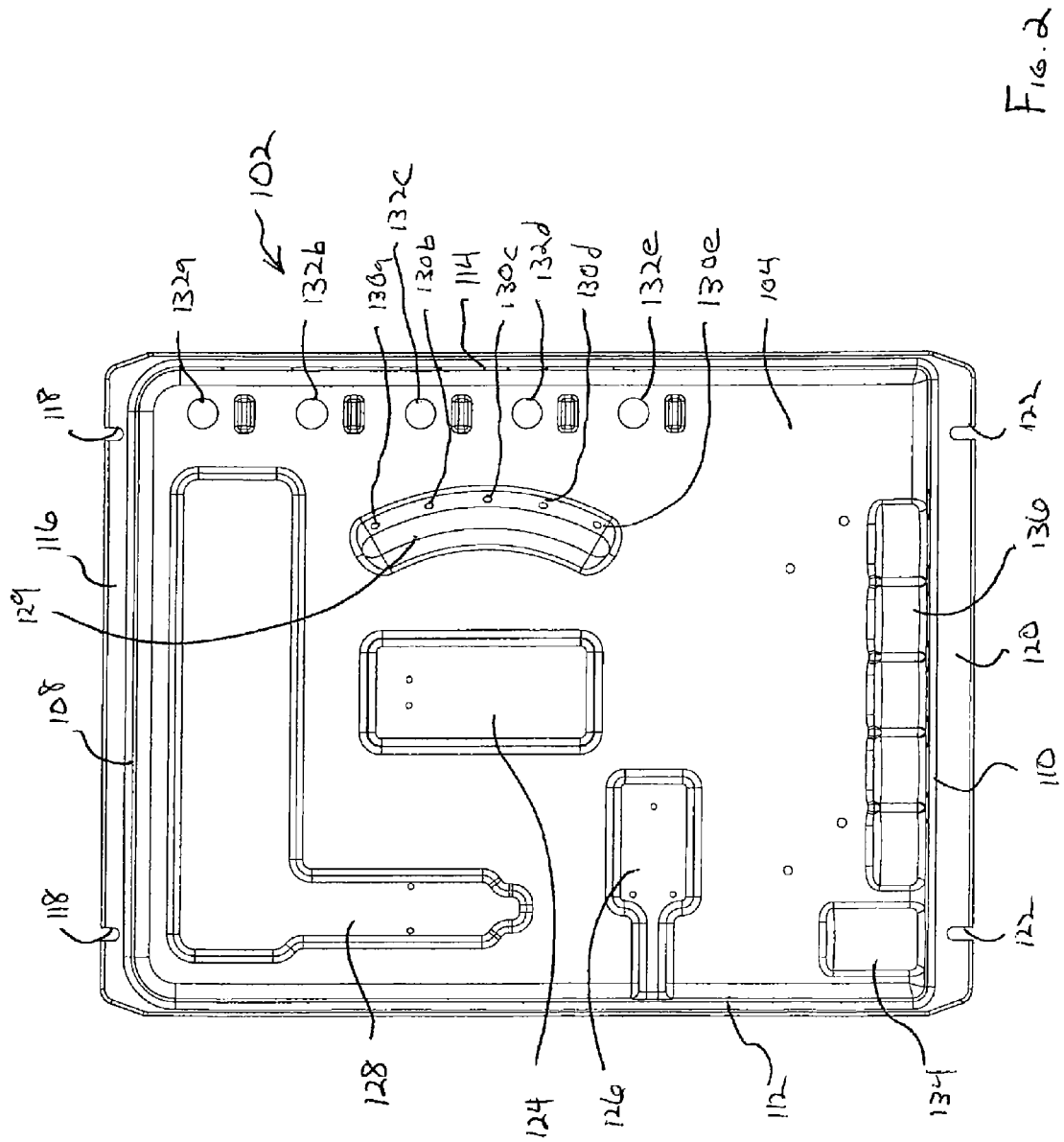
FIG. 2 is a detailed front view of a lower portion of the chemical dispensing panel of FIG. 1.
Figure 3:
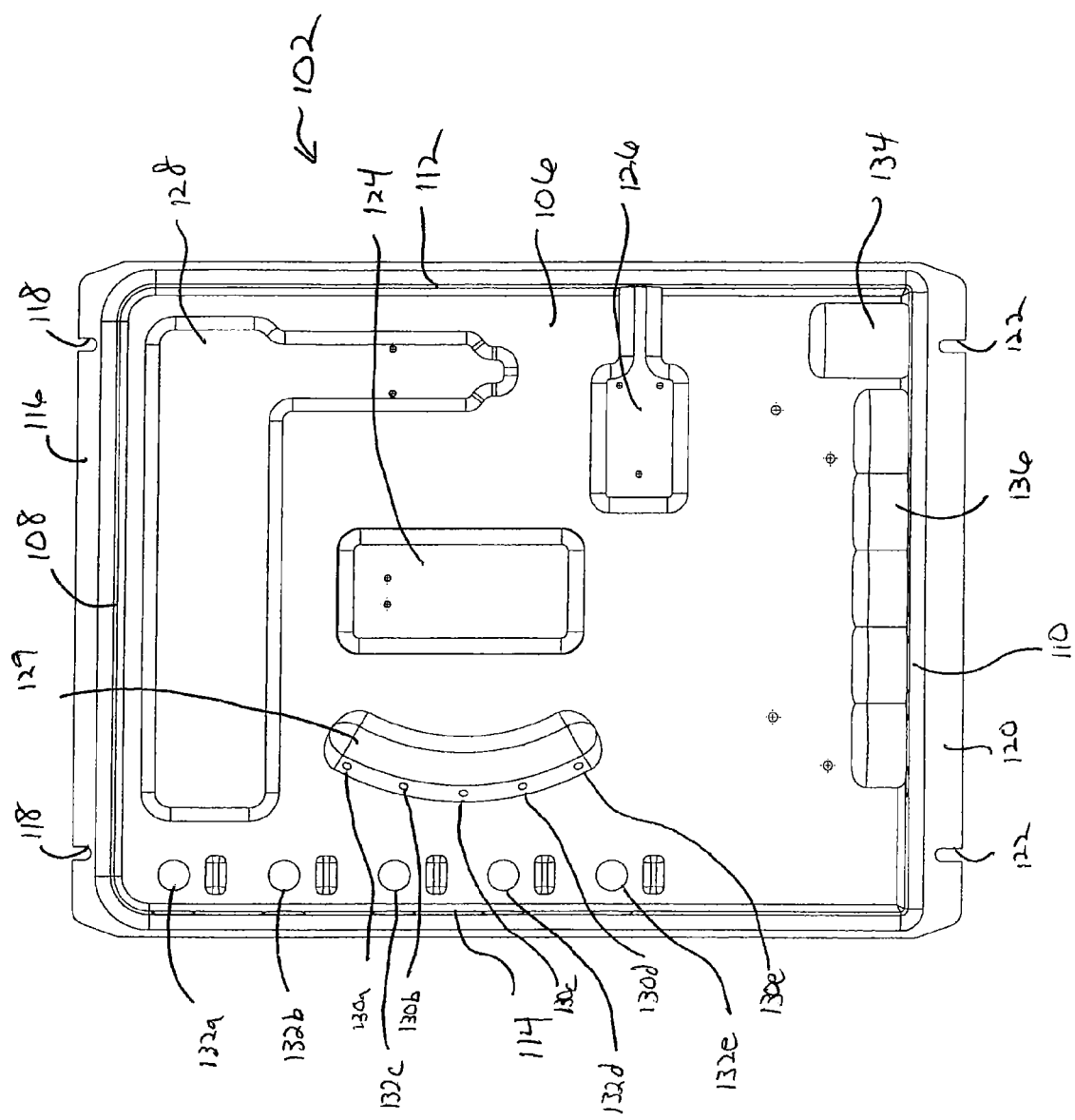
FIG. 3 is a detailed front view of an upper right portion of the chemical dispensing panel of FIG. 1.
Figure 4:
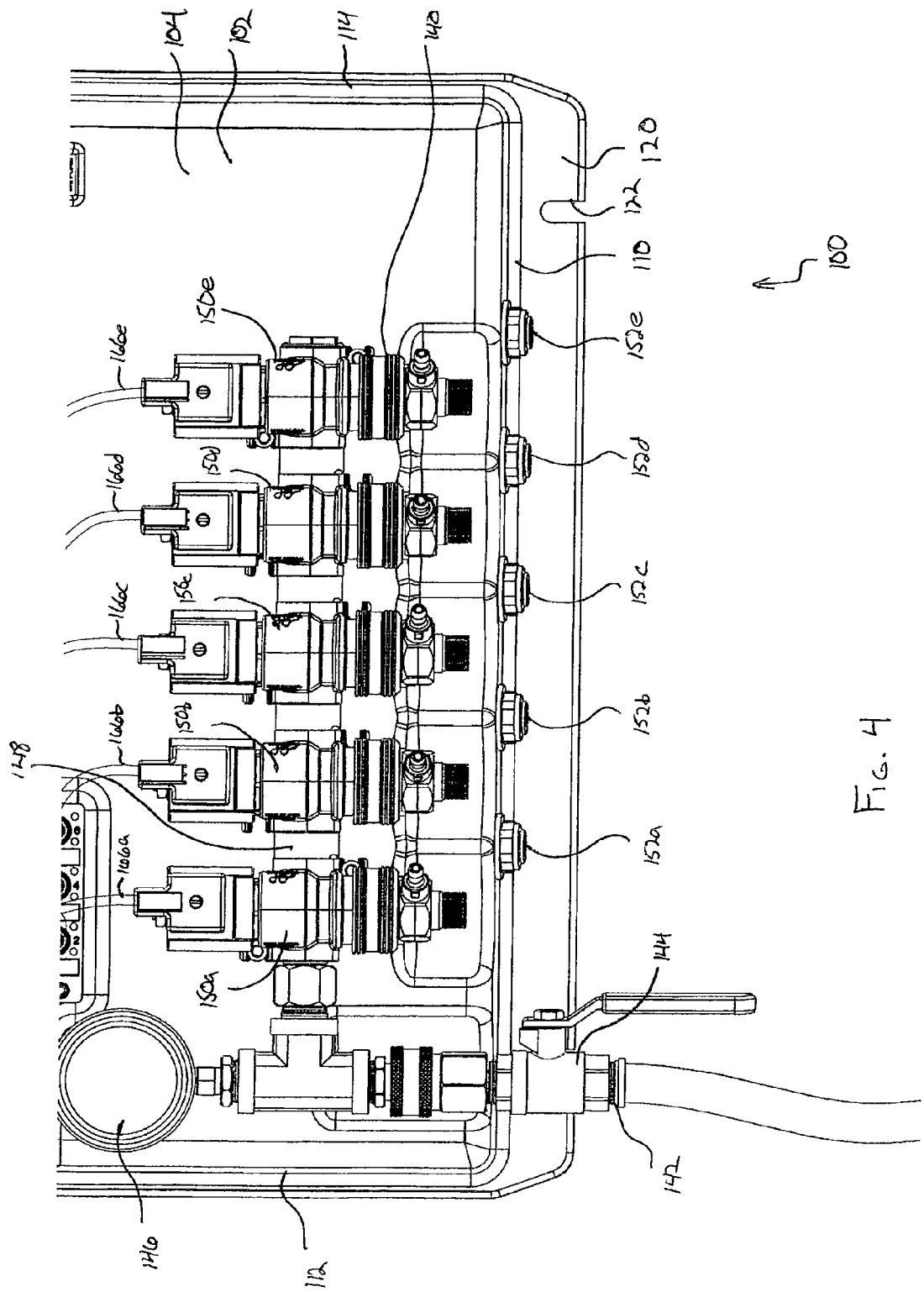
FIG. 4 is a front view of a molded routing panel according to an embodiment of the present invention.
Figure 5:
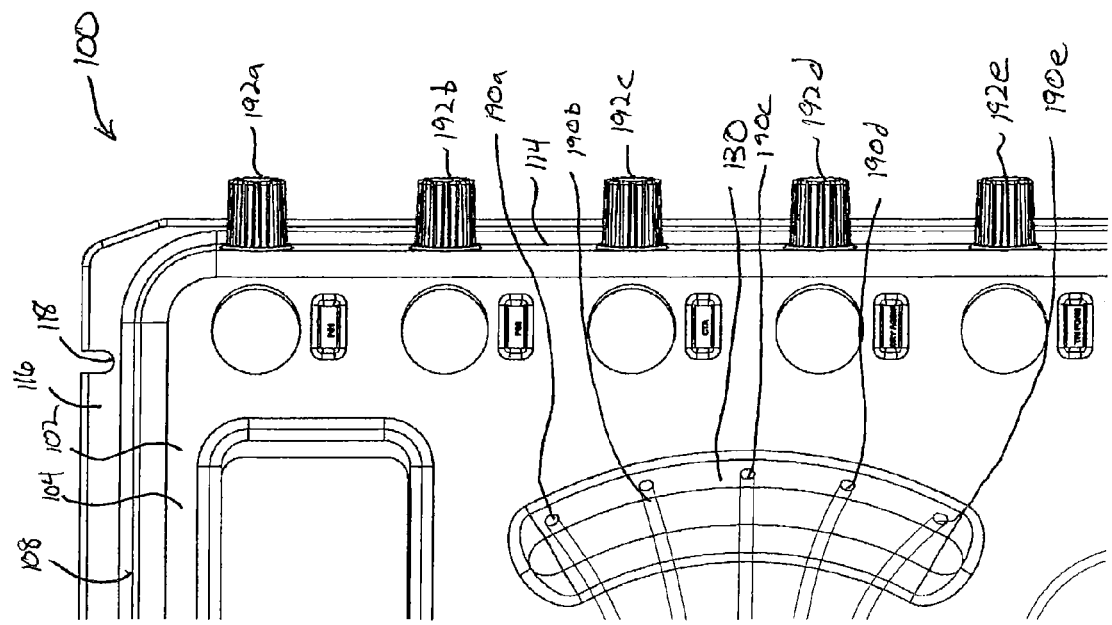
FIG. 5 is a rear view of the molded routing panel of FIG. 4.

As illustrated in FIGS. 1, 2 and 3, a representative embodiment of a chemical dispensing panel 100 generally comprises a molded routing panel 102 having a front mounting surface 104 and a rear mounting surface 106. Referring additionally to FIGS. 4 and 5, molded routing panel 102 further comprises an upper side wall 108, a lower side wall 110, a left side wall 112 and a right side wall 114. Upper side wall 108 includes an upper mounting flange 116 having a plurality of upper mounting apertures 118. Lower side wall 110 includes a lower mounting flange 120 having a plurality of lower mounting apertures 122. Molded routing panel 102 is generally molded of a suitable plastic polymer such as, for example, polyethylene and is formed through a suitable molding process such as, for example, vacuum forming. During forming, various recesses and apertures for mounting and routing of components are integrally formed in the molded routing panel 102 and include, for example, an air module mounting recess 124, a control module mounting recess 126, a pneumatic filter recess 128, an air outlet recess 129 having a plurality of air outlet apertures 130a, 130b, 130c, 130d, 130e, a plurality of foaming regulator mounting apertures 132a, 132b, 132c, 132d, 132e, a motive fluid inlet valve recess 134 and an injector manifold mounting recess 136. The presence of the various recesses and apertures simplify the assembly process by providing repeatable mounting locations for each component as well as cleaning up the appearance and shortening runs for control wiring, air tubing and fluid tubing. By minimizing the length of fluid tubing runs, friction effects are minimized so as to increase overall system efficiency.

Chemical dispensing panel 100 can further comprise an injector manifold assembly 140 attached within the injector manifold mounting recess 136 of the molded routing panel 102. Injector manifold assembly 140 generally comprises a motive fluid inlet 142, an inlet valve 144 and an inlet pressure gauge 146 mounted within the motive fluid inlet valve recess 134. Injector manifold assembly 140 further comprises an injector manifold 148. Injector manifold 148 can comprise a suitable injector assembly such as, for example, the HYDRA-CANNON™ injector system available from Hydra-Flex, Incorporated of Burnsville, Minn. and as described in United States Patent Publications 2006/0157131A1 and 2009/0090415A1, each of which are herein incorporated by reference in its entirety. As illustrated, injector manifold 148 comprises a five injector system including injectors 150a, 150b, 150c, 150d and 150e, though generally, injector manifold 148 will include at least three individual injectors and can include more than five individual injectors based upon specific chemical dispensing applications. Each of injectors 150a, 150b, 150c, 150d and 150e includes a unique internal venturi educator that is sized and dimensioned to correspond with a specific chemical and desired amounts of chemical to be introduced into the motive fluid. Injectors 150a, 150b, 150c, 150d, 150e are each individually controlled an opened to the motive fluid with a solenoid valve 151a, 151b, 151c, 151d, 151e. Once chemical is introduced into the motive fluid within the injectors 150a, 150b, 150c, 150d and 150e, a mixed chemical stream exits out of a corresponding injector outlet 152a, 152b, 152c, 152d, 152e.

Chemical dispensing panel 100 further comprises a control assembly 160. Generally, control assembly 160 includes an input signal line 162 connected to a control block 164. Control block 164 is generally mounted within control module mounting recess 126 to simplify assembly and provide protection to the various components of the control assembly 160. A plurality of injector control lines 166a, 166b, 166c, 166d, 166e run from the control block 164 to the corresponding injector 150a, 150b, 150c, 150d, 150e. In addition, a plurality of pneumatic control lines 166a, 166b, 166c, 166d, 166e are run from the control block 164 to a pneumatic assembly 178.

Pneumatic assembly 178 generally comprises a pneumatic inlet connection 180, a pressure regulator 182 and an air filter 184. From air filter 184, a filtered air line 186 runs to a plurality of pneumatic valves 188a, 188b, 188c, 188d, 188e. Pneumatic control lines 166a, 166b, 166c, 166d and 166e are each individually connected to the corresponding pneumatic valve 188a, 188b, 188c, 188d and 188e. A pneumatic outlet line 190a, 190b, 190c, 190d, 190e runs from each pneumatic valve 188a, 188b, 188c, 188d and 188e and extends through the front mounting surface 104 through air outlet apertures 130a, 130b, 130c, 130d, 130e to the rear mounting surface 106 at the air outlet recess 130. The pneumatic outlet lines 190a, 190b, 190c, 190d and 190e are individually connected to a corresponding air foam regulator 192a, 192b, 192c, 192d and 192e, each having a corresponding air foam outlet connector 194a, 194b, 194c, individually mounted in the right side wall 114 for ease of connection.

As seen in FIG. 4, a representative flow circuit 195a for chemical dispensing assembly 100 is illustrated. It will be understood that additional flow circuits operate can operate similarly, both independently and simultaneously, based upon the number of chemicals to be injected for the particular process. Generally, chemical dispensing assembly 100 is positioned above a bulk chemical tank 196a. A pair of fasteners are attached to a wall above the bulk chemical tank 196a and chemical dispensing assembly 100 is positioned such that the lower mounting apertures 122 set down onto the fasteners. Next, a pair of fasteners can be attached through the upper mounting apertures 118 such that the molded routing panel 102 is securely fastened to the wall. With the chemical dispensing panel 100 secured, all that is necessary to complete the installation is to connect a pressurized motive fluid line 191, a control signal input 193, a pneumatic supply line 195, a foaming air outlet line 197a, a mixing manifold 198a, a chemical eductor line 199a and a mixed fluid line 181a.

With the chemical dispensing assembly 100 installed, a mixed chemical stream can be supplied as requested by a process controller. For purposes of describing flow circuit 195a, operation will be described with respect to a representative car wash installation though it will be understood that the chemical dispensing assembly 100 can be similarly utilized in applications including, for example, food processing and preparation, wastewater treatment and industrial clean-in-place applications.

Generally, a system controller such as a carwash controller, Programmable Logic Controller (PLC) or other microprocessor based controller provides an input signal to the control block 164 that signifies the presence of a car within the car wash and requests that chemical be applied from the bulk chemical tank 196a. Chemical tank 196a can include a representative car wash chemical such as, for example, a pre-soak cleaner, a wheel cleaner, a post-soak cleaner, a liquid wax or a spot-free additive. Control block 164 provides an output, either electrical or pneumatic, through injector control line 166a to solenoid valve 151a causing solenoid valve 151a to open and expose injector 150a to the motive fluid. Based upon the size of the orifice and venturi dimensioning with the injector 150a, the chemical is drawn into the injector 150a through the chemical eductor line 199a and mixes with the motive fluid to a mixed fluid stream that exits the chemical dispensing assembly 100 through the injector outlet connector 152a and into the mixed fluid line 181a.

Figure 6:
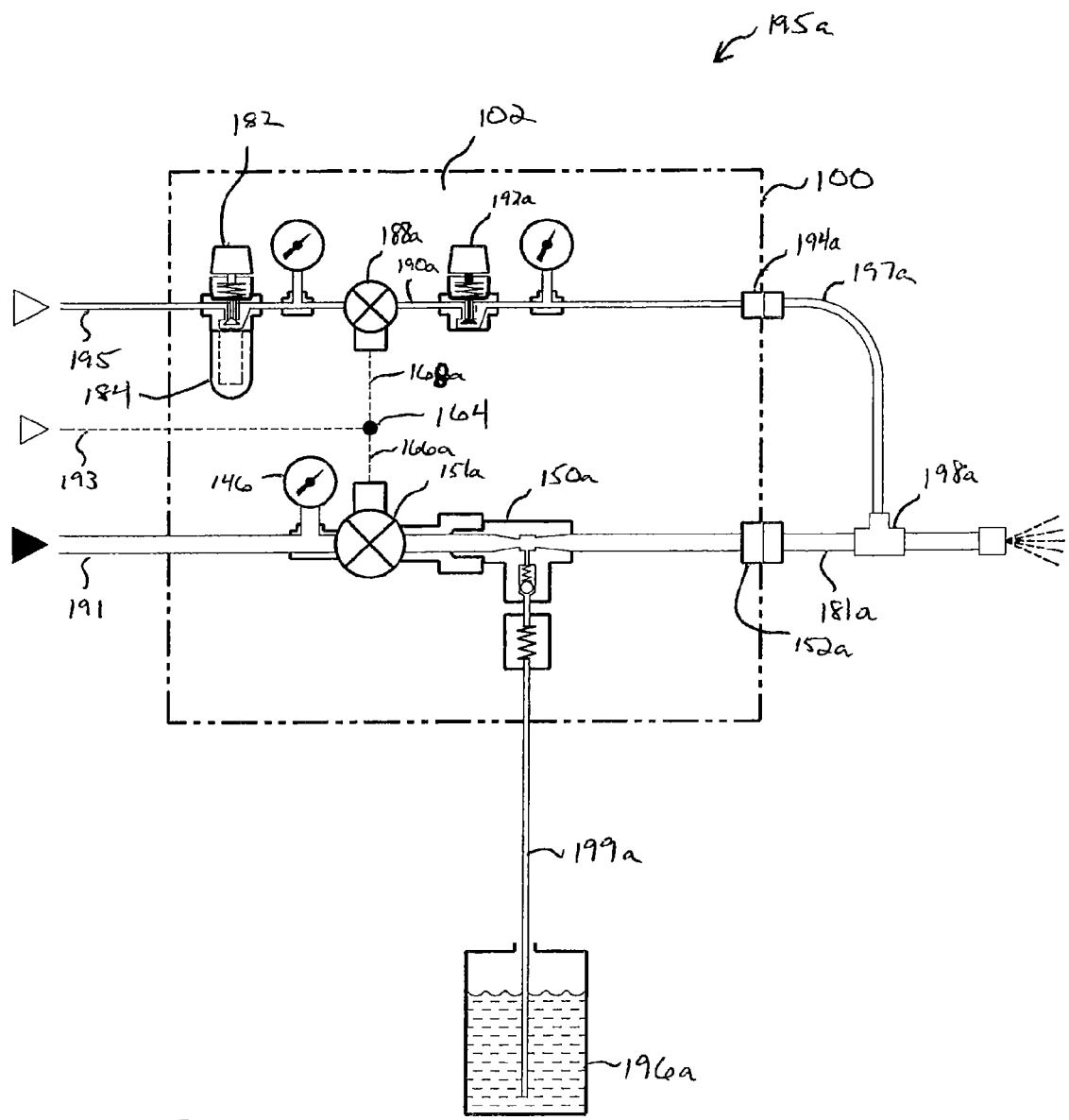
FIG. 6 is a schematic illustration of a flow dispensing circuit of the chemical dispensing assembly of FIG. 1.

Depending upon chemical being applied through flow circuit 195a, it may be desirable or advantageous to introduce air into the mixed fluid line 181a for purposes of foaming the chemical. In such a case, control block 164 simultaneously provides an output through pneumatic control line 168a such that pneumatic valve 188a is caused to open. Air is then supplied through the valve outlet line 190a where the outlet pressure can be regulated by the air foam regulator 192a. The regulated air supply exits the chemical dispensing assembly 100 through the air foam connector 194a and into foaming air outlet line 197a whereby the regulated air is directed to the mixing manifold 198a whereby the regulated air supply causes the mixed fluid stream to be foamed. The physical location of the mixing manifold 198a is process dependent and can be either on the molded routing panel 102 or alternatively, proximate a remote dispensing point 183a that is proximate a point of use. As illustrated in FIG. 6, remote dispensing point 183a can comprise a remote spraying point utilizing a rotary spray nozzle 185a such as those commercially available from Hydra Flex, Inc. of Burnsville, Minn. Though described only with respect to flow circuit 195a, it will be understood that operation of the "b", "c", "d" and "e" flow circuits of the described embodiment can operate in a similar manner.

Figure 7:
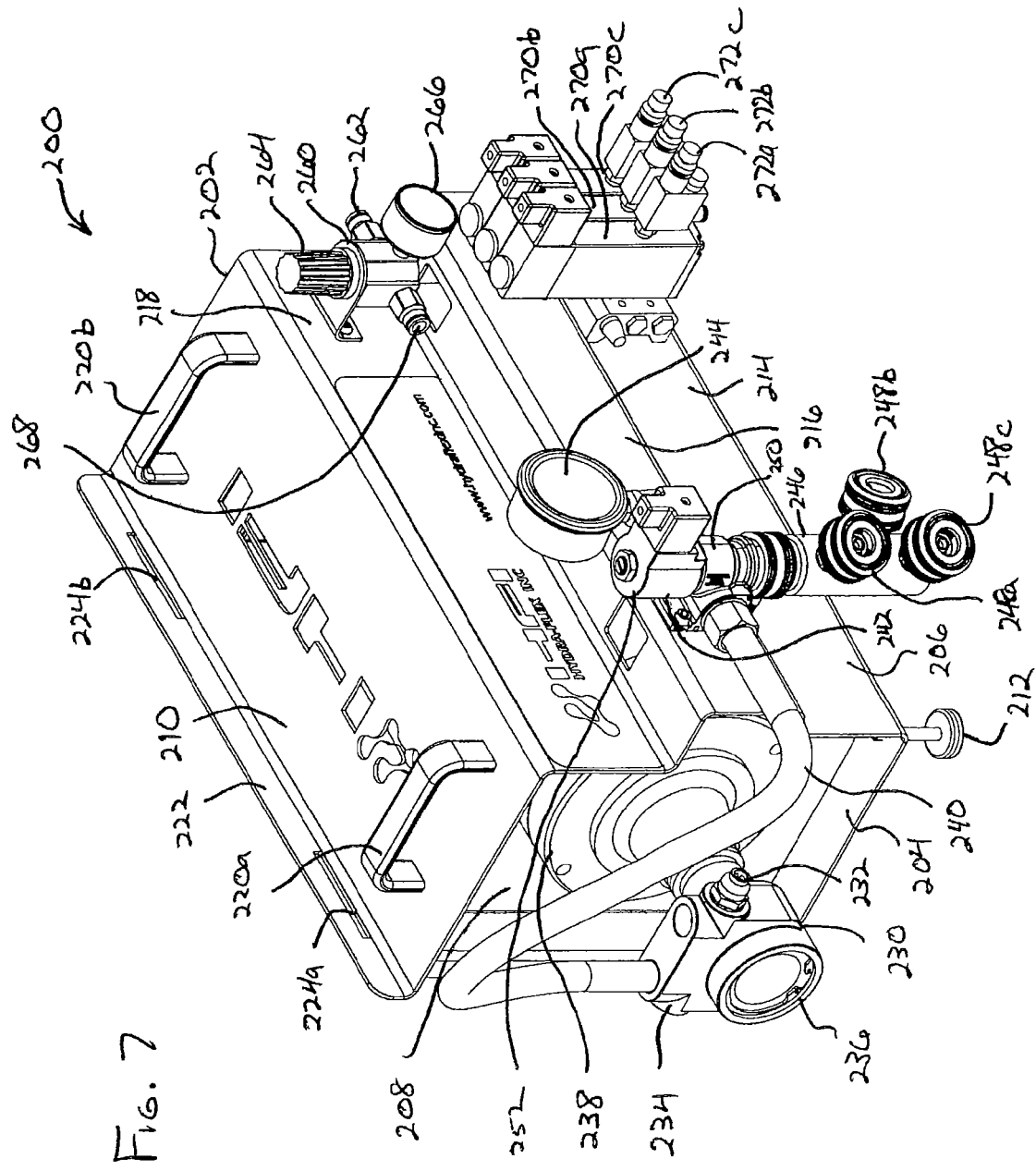
FIG. 7 is a top, front perspective view of a portable dispensing unit according to an embodiment of the present invention.
Figure 8:
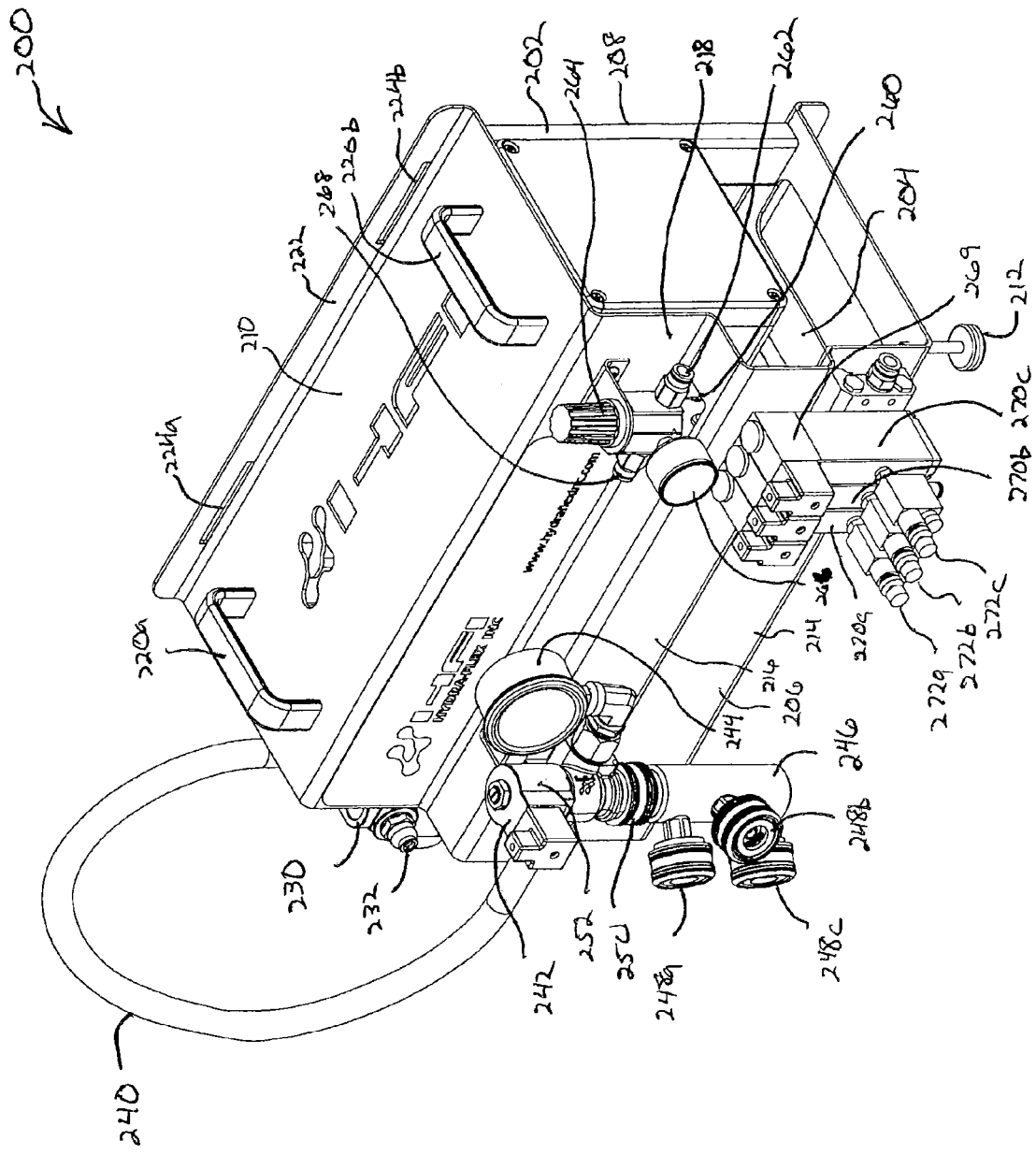
FIG. 8 is a top, front perspective view of the portable dispensing unit of FIG. 7.
Figure 9:
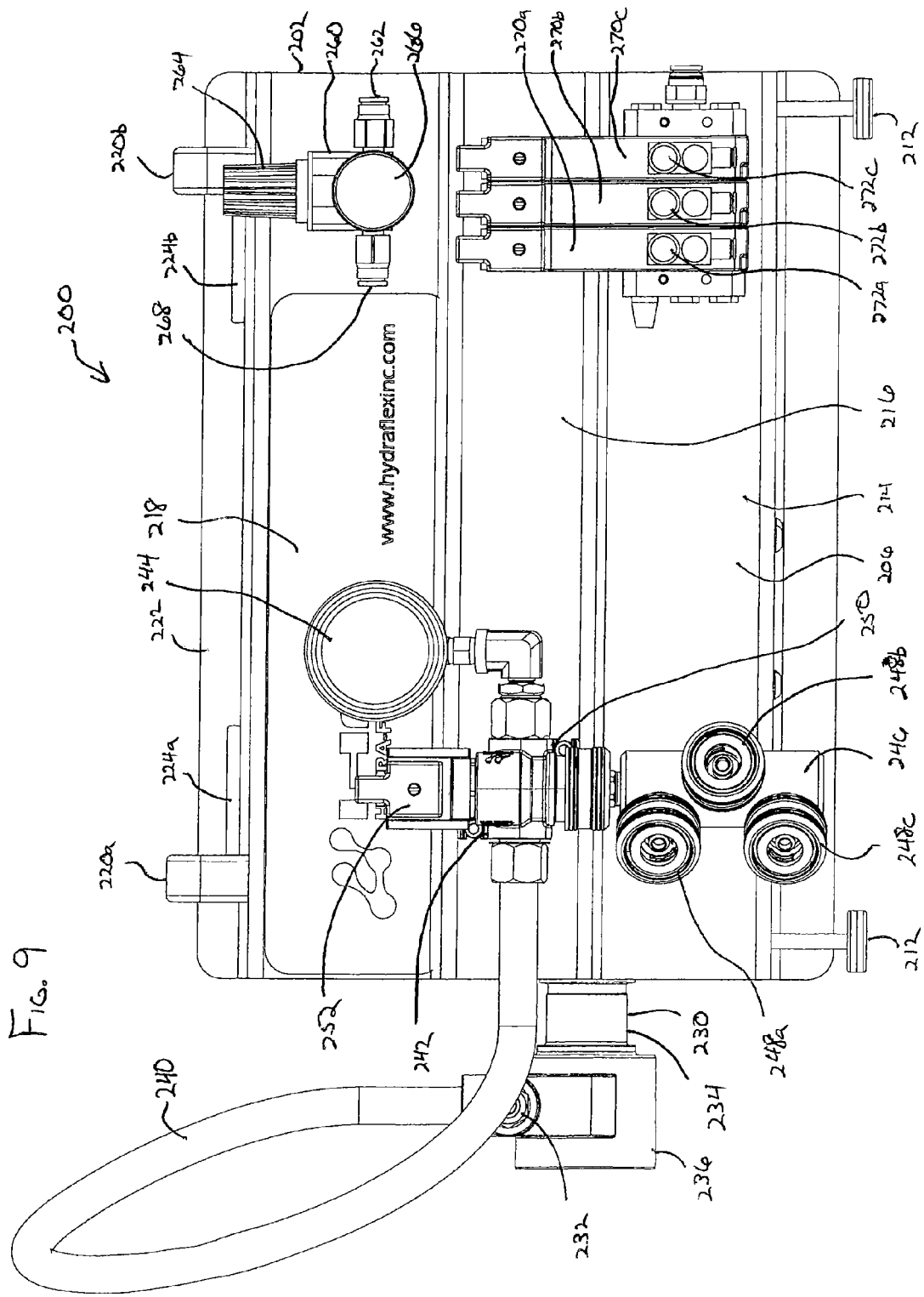
FIG. 9 is a front view of the portable dispensing unit of FIG. 7.

Referring now to FIGS. 7-9, a portable dispensing unit 200 according to an embodiment of the present invention can generally comprises a frame assembly 202. Frame assembly 202 is preferably formed of suitable high strength materials including for example, painted carbon steel and stainless steel. Frame assembly 202 generally includes a floor panel 204, a front panel 206, a rear panel 208 and a top panel 210. Floor panel 204 can include a plurality of adjustable feet 212. Front panel 206 can include a lower mounting surface 214, an intermediate mounting surface 216 and an upper mounting surface 218. Top panel 210 can include a pair of lifting handles 220a and 220b. Top panel 210 can further include a mounting flange 222 having a pair of mounting slots 224a, 224b.

Portable dispensing unit 200 further comprises a pressurized fluid assembly 230. Pressurized fluid assembly 230 generally includes a fluid inlet connection 232 and a pump assembly 234. Pump assembly 234 can comprise a pump 236 and a motor 238. From pump 236, a pressurized fluid supply line 238 directs a pressurized fluid to a fluid inlet valve 242 including a pressurized fluid pressure gauge 244. The high pressure fluid flows through the fluid inlet valve 242 and into an injector 250. Injector 250 includes a solenoid valve 252. Mounted to a mixed fluid outlet of the injector 250 is a tri-module manifold 246. Tri-module manifold 246 includes three individual outlet ports 248a, 248b, 248c for individually routing the mixed fluid to three different points of use.

Portable dispensing unit 200 further comprises a pneumatic assembly 260. Pneumatic assembly 260 generally comprises a pneumatic inlet port 262 for supplying pressurized air to an air regulator 264 having an air pressure gauge 266. From the air regulator 264, a regulated air line 268 connects to a pneumatic valve assembly 269. As illustrated, pneumatic valve assembly 269 includes three individual pneumatic valves 270a, 270b, 270c. Each pneumatic valve 270a, 270b, 270c includes a corresponding air foaming outlet 272a, 272b, 272c.

Figure 10:
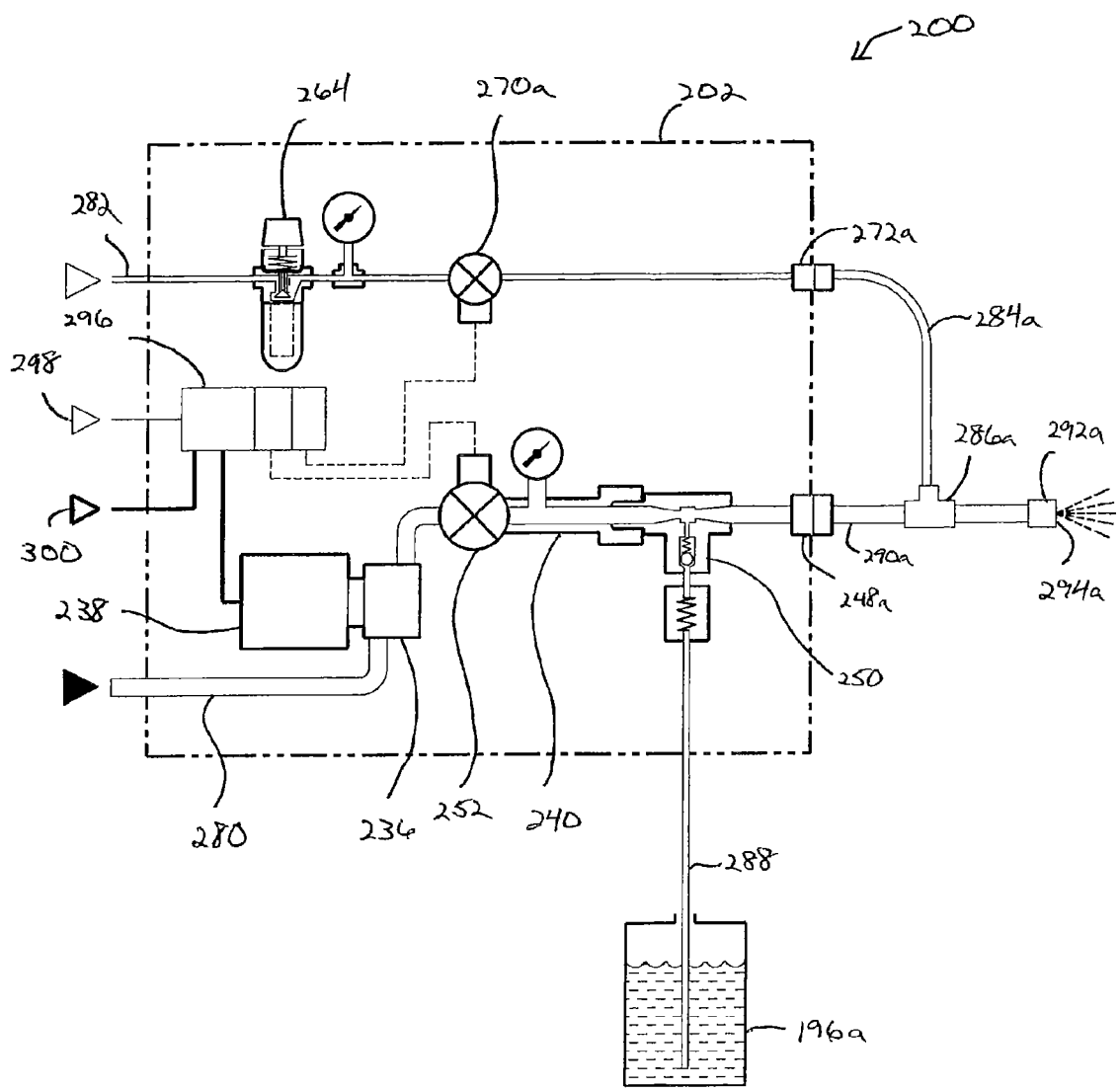
FIG. 10 is a schematic illustration of a flow dispensing circuit of the portable dispensing unit of FIG. 7.

Generally, portable dispensing unit 200 is capable of being lifted and carried to locations such as, for example, for pilot plant testing, for point of use testing or for temporary installations. Generally, portable dispensing unit 200 is carried to a point of use with lifting handles 220a, 220b. Portable dispensing unit 200 can be placed on a shelf above bulk chemical tank 196a such that the frame assembly 202 sits on adjustable feet 212. Alternatively, a pair of fasteners can be attached to a wall above the bulk chemical tank 196a and frame assembly 202 can be positioned such that mounting flange 222 is positioned flush against the wall. A pair of fasteners can then be attached to the wall through mounting slots 224a, 224b to securely fasten the portable dispensing unit 200 to the wall. With the chemical dispensing panel 100 secured, all that is necessary to complete the installation is to connect a motive fluid supply line 280, a pneumatic supply line 282, a foaming air outlet line 284*a*, a mixing manifold 286*a*, a chemical eductor line 288 and a mixed fluid line 290*a* as shown in FIG. 10.

Generally, power is run to an internal relay 296 that is capable of receiving an external control signal from a system controller 298 or alternatively, a signal directly from a power switch 300 on the frame assembly 202 such that internal relay 296 powers the motor 238, solenoid valve 252 and pneumatic valve 270*a* that indicates a user's desire to operate the portable dispensing unit 200. Motor 236 is energized such that pump 236 begins pressurizing a motive fluid. The pressurized fluid is directed through pressurized fluid supply line 240 and into the injector 250. Based upon the size of the orifice and venturi dimensioning with the injector 250, the chemical is drawn into the injector 250 through the chemical eductor line 288 where the chemical mixes with the motive fluid to form a mixed fluid stream that exits the portable dispensing unit 200 through outlet ports 248*a* and into mixed fluid line 290*a*.

If it is desired to introduce air into the mixed fluid line 290*a* for purposes of foaming the chemical, air is then supplied from the air regulator 264 to the pneumatic valve 270*a* through the regulated air line 268. The regulated air supply exits the portable dispensing unit 200 through the air foaming outlet 272*a* and into foaming air outlet line 284*a* whereby the regulated air is directed to the mixing manifold 286*a* for foaming the mixed fluid stream. The physical location of the mixing manifold 286*a* is process dependent and can be either on the frame assembly 202 or alternatively, proximate a remote dispensing point 292*a* that is proximate a point of use. As illustrated in FIG. 10, remote dispensing point 292*a* can comprise a remote spraying point utilizing a rotary spray nozzle 294*a* such as those commercially available from Hydra Flex, Inc. of Burnsville, Minn. Though described only with respect to flow through outlet port 248*a*, it will be understood that operation of outlet ports 248*b* and 248*c* of the described embodiment can operate in a similar manner.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents, as well as the following illustrative embodiments.

The invention claimed is:

1. A chemical dispensing panel, comprising:
a molded routing panel including a plurality of mounting recesses, the molded routing panel including an injector manifold assembly, a control assembly, and a pneumatic assembly mounted thereon, the molded routing panel further attaching to a pressurized motive fluid line, a control signal input, a plurality of chemical eductor lines and a plurality of mixed fluid lines, wherein the injector manifold assembly comprises a plurality of injectors with each injector having a corresponding solenoid valve, and wherein the control signal input remotely directs the control assembly to selectively open one or more of the solenoid valves such that a bulk chemical is educted into the one or more corresponding injectors through the corresponding chemical educator lines such that a mixed fluid is delivered to a point of use through the corresponding mixed fluid line, wherein the molded mounting recesses include a control module mounting recess for mounting the control assembly, a motive fluid inlet valve recess for mounting a pressurized motive fluid inlet and an injector manifold mounting recess for mounting the injector manifold assembly.

2. The chemical dispensing panel of claim 1, further comprising a pneumatic supply mounted on the molded routing panel.

3. The chemical dispensing panel of claim 2, wherein the molded mounting recesses include a pneumatic filter recess for mounting a pneumatic inlet regulator, an air module mounting recess form mounting a plurality of pneumatic valves and an air outlet recess including a plurality of air outlet apertures for running a plurality of pneumatic outlet lines from a front mounting surface to a rear mounting surface of the molded routing panel.

4. The chemical dispensing panel of claim 3, wherein the control signal input remotely directs the control apparatus to selectively open one or more pneumatic valves such pressurized air is selectively supplied through one or more of the pneumatic outlet lines and wherein the air is directed through one or more of a plurality of foaming air outlet lines.

5. The chemical dispensing panel of claim 4, further comprising a plurality of mixing manifolds, wherein each mixing manifold receives one of the mixed fluid lines and one of the foaming air outlet lines, wherein the air from the foaming air outlet line causes the bulk chemical within the mixed fluid line to foam.

6. The chemical dispensing panel of claim 5, wherein each mixing manifold is remotely located proximate a point of use.

7. The chemical dispensing panel of claim 4, wherein the injector manifold assembly comprises at least three injectors.

8. The chemical dispensing panel of claim 7, the one or more pneumatic valves comprises at least three pneumatic valves.

9. The chemical dispensing panel of claim 7, wherein each injector is individually replaceable using quick-disconnect fittings such that injectors can be repaired or replaced without removing the injector manifold assembly from the molded routing panel.

10. The chemical dispensing panel of claim 1, wherein the molded routing panel is vacuum formed so as to define the plurality of mounting recesses.

11. The chemical dispensing panel of claim 1, wherein the molded routing panel includes an upper mounting flange having a plurality of upper mounting apertures and a lower mounting flange having a plurality of lower mounting apertures, such that the molded routing panel can be fixedly mounted to a wall at a location above the bulk chemical.

12. A car wash including the chemical dispensing panel of claim 1.

* * * * *

UNITED STATES PATENT AND TRADEMARK OFFICE
CERTIFICATE OF CORRECTION

PATENT NO.        : 8,678,237 B2                     Page 1 of 1
APPLICATION NO.   : 13/460208
DATED             : March 25, 2014
INVENTOR(S)       : Jaime L. Harris et al.

It is certified that error appears in the above-identified patent and that said Letters Patent is hereby corrected as shown below:

In the Specification

At column 4, lines 39-40:
    "a unique internal venturi educator"

should read:
    --a unique internal venturi eductor--

In the Claims

At column 8, line 3 (Claim 1, line 15):
    "chemical educator lines"

should read:
    --chemical eductor lines--

Signed and Sealed this
Fifteenth Day of March, 2016

Michelle K. Lee
*Director of the United States Patent and Trademark Office*